G. H. CAVANAGH.
MEASURING MACHINE.
APPLICATION FILED AUG. 11, 1913.
1,095,705.
Patented May 5, 1914.
2 SHEETS—SHEET 2.
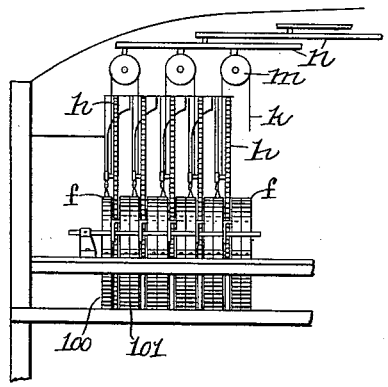
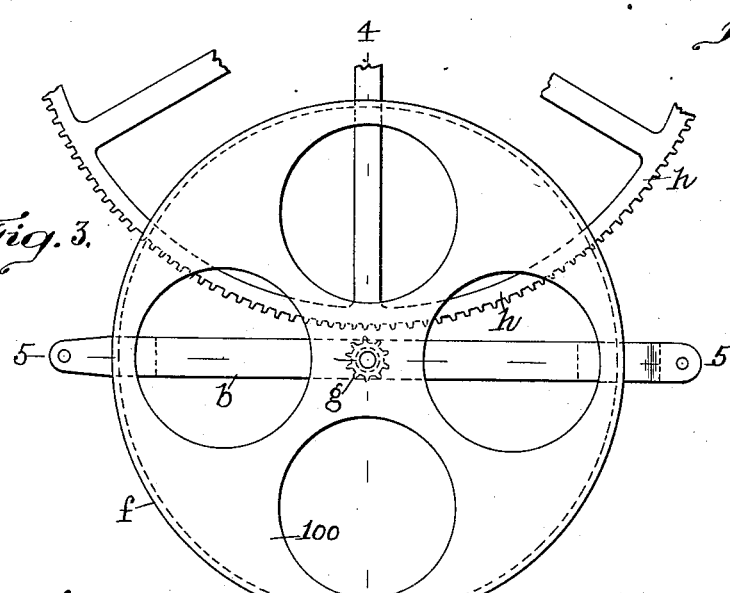
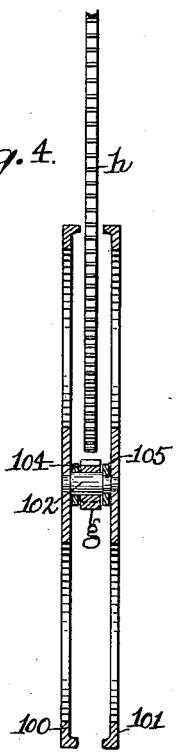
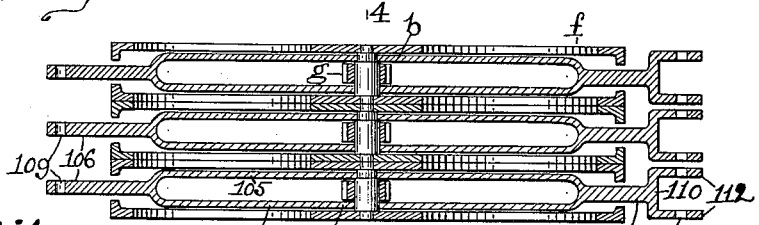
Witnesses:
Ernest A. Telfer
J. Murphy
Inventor:
George H. Cavanagh
by Jas. H. Churchill
atty.

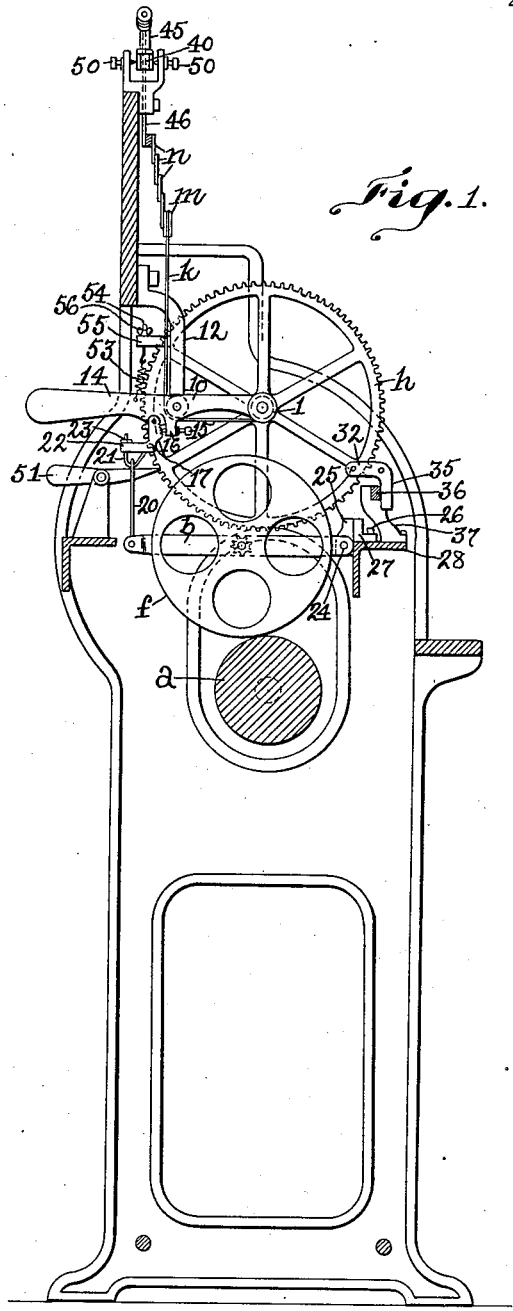

UNITED STATES PATENT OFFICE.

GEORGE H. CAVANAGH, OF BROOKLINE, MASSACHUSETTS.

MEASURING-MACHINE.

1,095,705.  Specification of Letters Patent.  Patented May 5, 1914.

Application filed August 11, 1913. Serial No. 784,045.

*To all whom it may concern:*

Be it known that I, GEORGE H. CAVANAGH, a citizen of the United States, residing in Brookline, county of Norfolk, and State of Massachusetts, have invented an Improvement in Measuring-Machines, of which the following description, in connection with the accompanying drawings, is a specification, like characters on the drawings representing like parts.

This invention relates to machines for measuring surface areas and is herein shown as embodied in a machine substantially such as shown and described in U. S. Patent No. 931,144, dated August 17, 1909.

The present invention has for its object to increase the efficiency and accuracy of measuring machines of the class described, and to this end, the machine is provided with a novel construction of measuring wheel and a novel arrangement of the support therefor, whereby a larger number of measuring wheels may be incorporated in a machine of given width, as will be described.

The particular features of this invention will be pointed out in the claims at the end of this specification.

Figure 1 is a vertical section of a measuring machine embodying the invention. Fig. 2, a detail in elevation of a portion of the machine shown in Fig. 1, looking toward the left. Fig. 3, an elevation on an enlarged scale of one of the measuring wheels and a portion of its coöperating segment. Fig. 4, a vertical section on the line 4—4, Fig. 3, with the segment in elevation, and Fig. 5, a horizontal section on the line 5—5, Fig. 3.

Referring to the drawing, *f* represents the improved measuring wheel, which, in accordance with this invention, is composed of two side disks or circular members 100, 101, preferably struck up or punched from a metal plate and mounted on the opposite ends of a shaft or center pin 102, to which they may be secured by friction, and by which they are spaced apart so that the two disks or members form a wheel having a width substantially equal to the measuring wheel of the machine shown in the patent referred to and now commonly used on said machines.

The measuring wheel *f* is supported by a lever *b* located between the disks 100, 101, and through which the shaft or center pin 102 is passed, said lever comprising two substantially parallel arms 104, 105, which are spaced apart and are united at their opposite ends to bars or webs 106, 107, which are substantially thin and project between the said disks and beyond the circumferences of the same. One of the webs 106 is provided as shown with a hole 109 through it, and the other web is attached to the back piece of a yoke 110 having arms 112, which are provided as shown with holes 113. The construction of the end portions of the lever *b* is for the purpose of enabling the lever to be substituted for the supporting lever 18 shown in the patent referred to, without other change in the machine. The center pin 102 of the measuring wheel *f* has fast on it a pinion *g*, which is located between the arms 104, 105 of the supporting lever, and with which coöperates a toothed device, herein shown as a wheel *h*, the same as in the patent referred to, but which may be a segment of a toothed wheel. The toothed wheel *h* extends into the space between the side disks 100, 101, of the measuring wheel *f* and is supported by the counterbalanced lever 10, the same as in the patent referred to.

The remaining parts of the machine are and may be the same as those shown in the patent referred to, and operate in the same manner, and therefore need be but briefly described, as they constitute no part of the present invention, and such parts will be identified by the characters used in the patent.

The lever *b* is pivoted at 24 to a block 25, which is fastened by bolts 26 to a lug 27 secured to a cross bar 28 of the framework of the machine. The lever *b* is adjustably connected with the lever 10 by a screw 15 extended through a finger or lug 16 depending from the lever 10 near its center and coöperating with a bent lever 17, pivoted at its upper end to the arm 14 of the lever 10 and having its free end connected with the free end of the lever *b*, which has pivotally connected with it a link 20, whose upper end is bent or curved to form a hook, which engages a substantially U-shaped rod 21, which is extended up through the arm 22 of the lever 17 and has one leg or member engaging the upright portion of the lever 17 and the other leg or member threaded to be engaged by a nut 23, by means of which the connection between the levers 10, *b*, may be lengthened or shortened so as to properly adjust the measuring wheel *f* with relation to the bed roll *a*.

The toothed wheels $h$ are provided with grooved hubs or pulleys $i$, which are operatively connected with the usual index or pointer (not shown) by means of a system of cords $k$, pulleys $m$, levers $n$, cord 46, and upright 45 on the main lever 40, which is provided with the pivots 50. The toothed wheel $h$ is provided with the combined weight and stop 32, 35, which coöperates with the cross bar 36, supported by brackets 37 on the cross bar 28 of the framework. The levers 10 are held in their normal position with the wheel $h$ in proximity to the pinions $g$, by the springs 53 connected with the threaded rods 54, extended through lugs 55 on the arms 12 and engaged by the nuts 56.

By reference to the drawings and especially Figs. 2 and 5, it will be seen that adjacent measuring wheels $f$ are brought close together, and may have their adjacent side disks substantially in contact, with the result, that a larger number of the measuring wheels may be incorporated in a machine of given width, and, as a result, greater accuracy in the measurement of surface areas, such as those of hides and skins, is obtained. To illustrate: In a machine constructed like that shown in the patent and of a width of five feet, the number of measuring wheels is limited to 40, whereas in the machine herein shown of the same width the number of measuring wheels can be increased to 57. In wider machines, the same ratio of increase holds true, as, for instance, in a machine six feet wide, the number of measuring wheels may be increased from 48 to 69, that is, an increase of seven wheels for every two feet.

The operation of the machine herein shown is the same as that described in the patent and need only be briefly referred to.

The hide or skin whose surface area is to be measured is presented to the bed roll $a$, which is revolved in any suitable manner, and which carries the hide or skin between it and the measuring wheels $f$, with which the hide or skin makes contact. The hide or skin lifts the measuring wheels under which it passes, and at the same time the toothed wheel $h$ is lowered into engagement with the pinion $g$ and is revolved thereby. The rotary motion of the toothed wheels $h$ is transmitted to the index or pointer (not shown), and the surface area of the hide or skin is indicated on a dial (not shown), but with which the pointer referred to coöperates as is common in measuring machines of this class. The toothed wheels are held in the positions into which they are rotated by the hide or skin, by holding pawls 51, until the pawls are disengaged by the operator.

Claims.

1. In a machine of the character described, in combination, a measuring wheel provided with side members separated from each other, a center shaft connecting said members, a pinion on said center shaft between said members, a lever located between said members and in which said center shaft is supported to turn therein, and a toothed device extended between said side members and coöperating with said pinion.

2. In a machine of the character described, in combination, a measuring wheel provided with side members separated from each other, a center shaft connecting said members, a pinion on said center shaft between said members, a support for said center shaft located between said side members, and a toothed device extended between said side members and coöperating with said pinion.

In testimony whereof, I have signed my name to this specification in the presence of two subscribing witnesses.

GEORGE H. CAVANAGH.

Witnesses:
JAS. H. CHURCHILL,
J. MURPHY.